March 24, 1959 J. A. C. YULE 2,879,326

BLACK PRINTER FOR ELECTRO-OPTICAL REPRODUCTION

Filed Aug. 27, 1952 3 Sheets-Sheet 1

JOHN A.C. YULE
INVENTOR.

BY Daniel I. Mayne, Emerson Holmes

ATTORNEYS

March 24, 1959 J. A. C. YULE 2,879,326

BLACK PRINTER FOR ELECTRO-OPTICAL REPRODUCTION

Filed Aug. 27, 1952 3 Sheets-Sheet 2

JOHN A. C. YULE
INVENTOR.

Daniel J. Mayne

BY J. M. Emerson Holmes

ATTORNEYS

March 24, 1959 J. A. C. YULE 2,879,326

BLACK PRINTER FOR ELECTRO-OPTICAL REPRODUCTION

Filed Aug. 27, 1952 3 Sheets-Sheet 3

JOHN A. C. YULE
INVENTOR.

Daniel I. Mayne

BY Wm. Emerson Holmes

ATTORNEYS

United States Patent Office 2,879,326

Patented Mar. 24, 1959

2,879,326

BLACK PRINTER FOR ELECTRO-OPTICAL REPRODUCTION

John A. C. Yule, Rochester, N.Y., assignor to Eastman Kodak Company, Rochester, N.Y., a corporation of New Jersey Application August 27, 1952, Serial No. 306,657

12 Claims. (Cl. 178—5.4)

Figure 1:
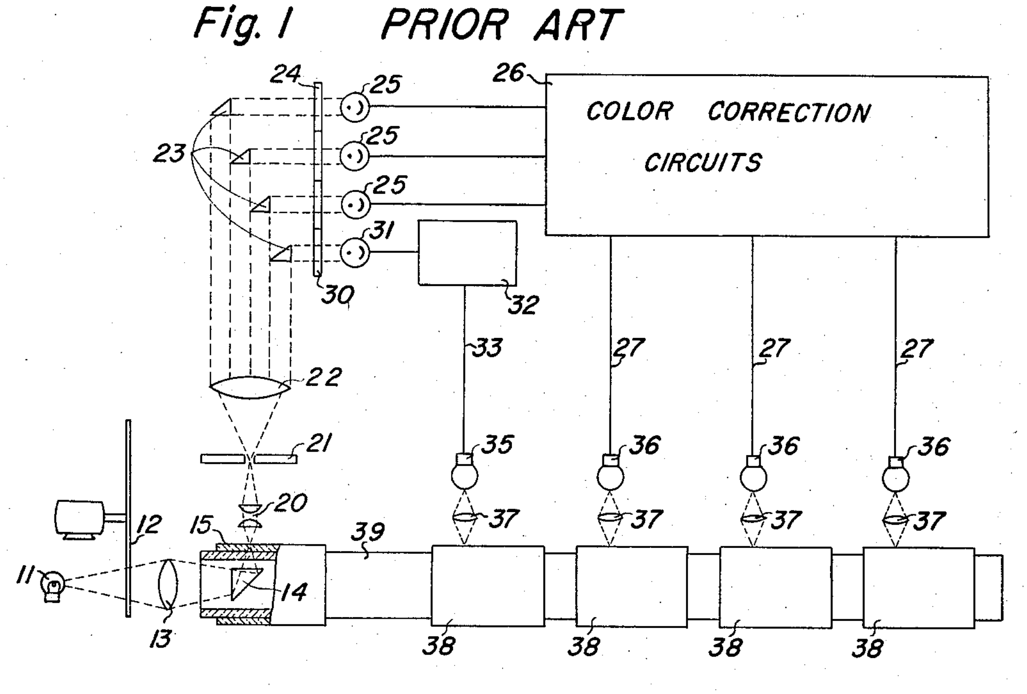
Fig. 1 PRIOR ART

This invention relates to electro-optical methods and apparatus for the reproduction of colored pictures. It relates specifically to that part of such electro-optical systems which has to do with the production of a black printer signal.

Electro-optical color reproduction systems, in which a multi-colored original or three color separations made photographically therefrom, are scanned to produce signals corresponding to the primary blue, primary green, and primary red components of the original, are quite well known. Methods of introducing color correction in the preparation of so-called cyan, magenta, and yellow printers from these signals are also well known. The production of a black printer signal and eventually a black printer by scanning the original by infrared light has also been suggested, but it is more common practice to select the greatest of the red, green, and blue components, i.e., the least subtractive color (cyan, magenta, and yellow) content and to use this selected signal or some constant portion thereof as the black printer signal. It is also customary to provide so-called "undercolor correction" of the color printer signals "decreasing" each of them by an amount equal to or in direct proportion to the black printer signal.

All such prior systems suffer from certain deficiencies and the object of the present invention is to overcome these deficiencies and to provide a method and apparatus for producing a black printer signal superior to those previously obtainable.

To avoid ambiguities and stilted language, all signals will be considered with reference to the corresponding signal for "white," i.e., to the signal from a white area in the original or in a positive record thereof. A signal is "decreased" if the difference between the signal and one from white is decreased. All signals are relative anyway and the signal obtained from a white area in the original subject is the reference zero signal, whether in a positive or a negative.

One of the shortcomings of the black printer proportional to the least predominant subtractive color content occurs in the reproduction of certain colors such as dark blue. Obviously, a dark blue has a very low yellow content and hence would have a low black printer value, but it is not possible to reproduce a dark blue using magenta and cyan inks only. It has been found that a more pleasing reproduction of dark blue involves a high black printer content.

Another shortcoming of such systems occurs whenever the color correction deviates from its optimum value since the black printer tends to follow the mistake in color correction and hence to enhance any such error. The system according to the present invention, on the other hand, produces a black printer which tends to compensate for any errors which inadvertently occur in the color correction phases of the electro-optical system.

As will be discussed at some length below, the present invention is, in one sense, independent of whether the color signals have been provided with undercolor correction. However, in many color printing processes it has been found best to keep the amount of each color to a minimum and to use a high black printer content. For example, the adherence of certain colors when printed over other colors, particularly in so-called "wet printing processes" is not perfect and hence it is desirable to provide undercolor correction for the color printers. Similarly, the control of color balance in many processes becomes very much less critical when undercolor correction is provided and a maximum or nearly maximum amount of black is used. For example, this means that the grey scale is reproduced almost entirely by the black printer. Thirdly, the detail in a picture may be carrier by the black printer and if the color printers are held to a minimum by undercolor correction, the registration of the four printers is not so critical.

The present method of producing a black printer is of major importance in those systems having undercolor correction of the color printers.

Fundamentally, the present invention consists of producing a signal corresponding to the ortholuminous value (i.e., the visual tone value) of the original and then reducing this signal by the amount of tone which will be printed by the three color printers. If no color printers are used, the black printer signal would not be reduced and hence the black printer would give a "perfect" black and white reproduction of the original. If the color printers are color corrected or, on the other hand, if they contain any errors in tone such as flat highlights or limited shadow density, the amount by which the ortholuminous signal is corrected will contain these same factors so that the final black printer signal still gives the correct tone to the final pictures.

The next factor to be considered is the actual form of the modification of the ortholuminous signal by the color printer signals. If one were working with a transparency in which each of the subtractive color images is a continuous one, the rule of additivity of densities would hold within a reasonable degree of approximation. That is, the total density to primary blue would be the sum of the densities of the cyan image to blue, the magenta image to blue, and the yellow image to blue. This is the "additivity rule." However, this rule is far from true in the case of any reflection print particularly in the case of a halftone reflection print in which the individual colors are printed as halftone dots, partly side by side and partly superimposed but not additive even in the areas of superposition. In fact, it turns out that for certain inks the luminous density of the resultant print approximately equals the sum of the luminous density of the cyan content, the luminous density of the magenta content, the luminous density of the yellow content, and the luminous density of the black content. This is purely a fortuitous circumstance due to the tendency of the impurity of the inks to compensate for the failure of the additivity law when the inks are superimposed. For example, three "perfect" subtractive color inks when superimposed should, by the additivity rule, give black since they absorb in different regions of the spectrum whereas separately they have tone value or density less than .48 since each of them reflects ⅔ of the spectrum. Thus by theory the three "perfect" inks each with a density of .48 should add to an infinite density, but practical inks of this density do not even add to a density of 1.44, due to all of the factors discussed above.

The following table gives an actual example in which visual densities are measured. It will be seen that the actual visual density of a four color proof is very close to the sum of the visual densities of the four separate colors, apparently due to the compensating factors just discussed.

| Luminous Density | Color | | | | | | | |
|---|---|---|---|---|---|---|---|---|
| | Solid Magenta | Solid Cyan | Solid Yellow | Red | Violet | Light Gray | Medium Gray | Dark Gray |
| Yellow proof | | | 0.03 | 0 | 0 | 0 | 0.01 | 0.03 |
| Magenta proof | 0.53 | | | 0.52 | 0.50 | 0.03 | 0.16 | 0.42 |
| Cyan proof | | 0.52 | | 0.02 | 0.33 | 0.02 | 0.18 | 0.34 |
| Black proof | | | | 0.06 | 0.07 | 0.05 | 0.15 | 0.63 |
| Sum of densities | 0.53 | 0.52 | 0.03 | 0.60 | 0.90 | 0.10 | 0.50 | 1.42 |
| 4-color proof | 0.53 | 0.52 | 0.03 | 0.55 | 0.93 | 0.12 | 0.51 | 1.34 |
| Error | | | | −0.05 | +0.03 | +0.02 | +0.01 | −0.08 |

Thus it turns out that in halftone processes the proper correction of the ortholuminous signal is by successive masking by the individual color signals. The yellow signal represents a very small tone value and simple division by the cyan and magenta printer signals suffices for most cases. To the extent that this simple process may result in pure yellows appearing slightly dirty or gray, a small portion of the yellow signal may be added to the magenta and cyan signals before the ortholuminous is divided by the latter signals. The amount of correction for yellow is very small anyway and the exact form of this correction function is not at all critical.

The ortholuminous signal may be derived by scanning the original through a very light yellow filter or by scanning a color separation of the original made through a yellow filter. Alternatively and preferably, the ortholuminous signal is simply derived by adding the three primary color signals suitably weighted to correspond to the visibility curve of the eye.

It will be noted that in those embodiments of the invention in which each of the color signals is undercolor corrected by the least of the three, this least predominant signal is not used at all in the making of the black printer signal. Furthermore, this least predominant signal is not modified in any way by the ortholuminous signal. In the present system, the black printer signal is made directly from the ortholuminous signal modified by the final color printer signals themselves whether color corrected or undercolor corrected or both.

Figure 2:
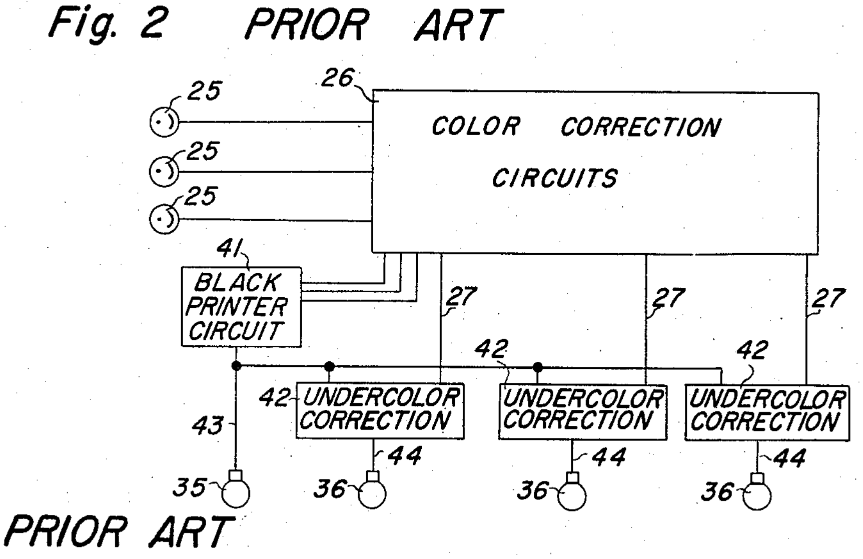
Fig. 2 PRIOR ART
Figure 3:
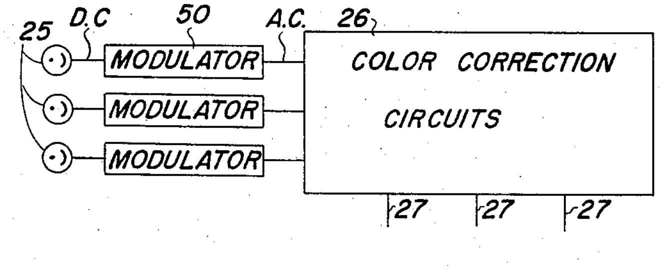
Fig. 3 PRIOR ART

Methods of selecting the least or greatest of three signals, methods of adding two or more signals and methods of dividing one signal by another as well as methods of compressing or expanding signals according to certain functions are all well known and such details are not a critical part of the present invention. The invention will be more fully understood from the following description when read in connection with the accompanying drawings in which:

Figs. 1, 2, and 3 illustrate electro-optical circuits and various elements thereof according to the prior art.

Figs. 4, 5, 6, and 7 illustrate the circuit details of various systems for producing an ortholuminous signal from the three primary color signals of a scanning system.

Figure 8:
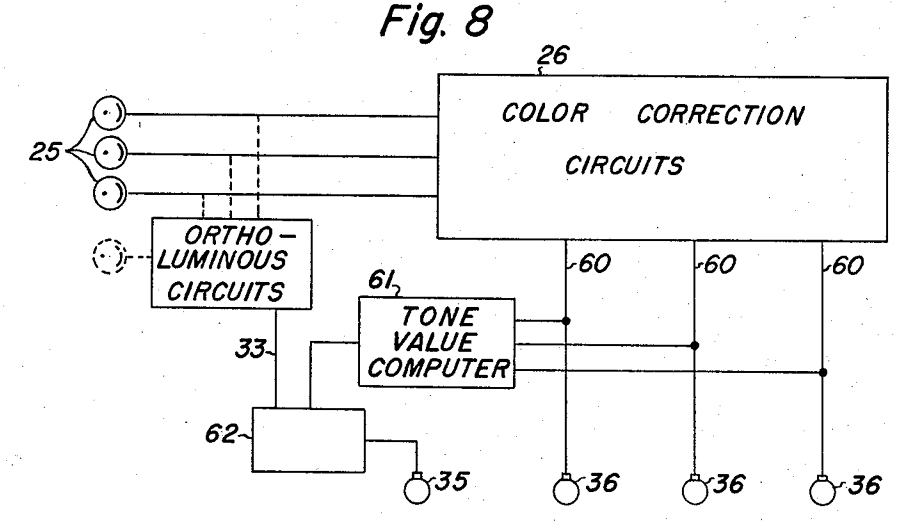

Fig. 8 schematically illustrates a circuit representing the general principle of the present invention.

Figure 9:
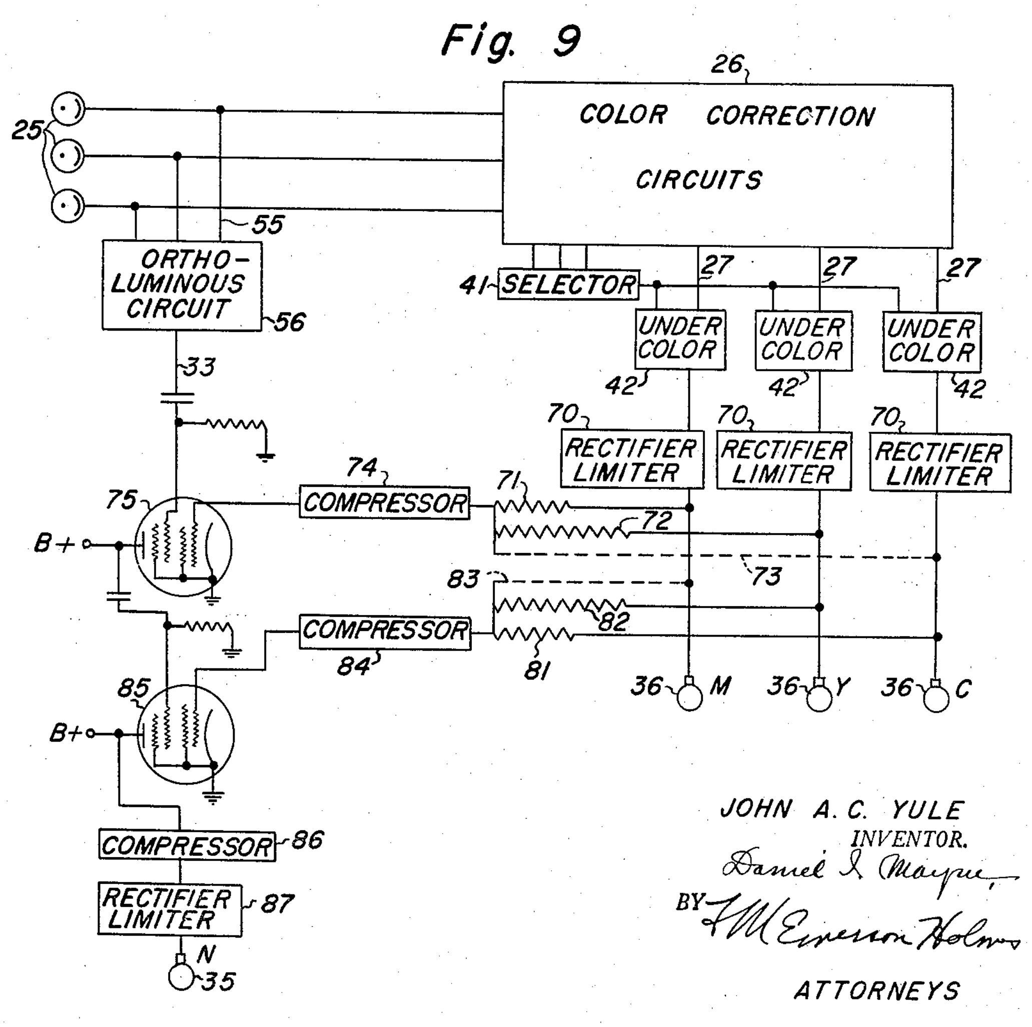

Fig. 9 similarly illustrates a preferred embodiment of the present invention.

In Fig. 1 light from a lamp 11 is interrupted by a chopper 12 and focused by a condenser lens 13 and prism 14 on a color transparency 15 wrapped on a transparent cylinder 39. A point of light from the illuminated area is focused by lens 20 on an aperture in a mask 21 and is then collimated by a lens 22 and directed to four reflecting prisms 23 which act as beam splitters and which reflect the light through the three primary color filters 24 and an infrared filter 30. The primary color signals are established by photocells 25 and amplified, with color correction of known type, in color correction circuits 26. These establish magenta, yellow, and cyan printer signals in wires 27 which operate glow lamps 36. Similarly light from the photocell 31 is amplified by amplifier 32 to establish a black printer signal in wire 33 which operates a glow lamp 35. Light from the four glow lamps 35 and 36 is focused by lenses 37 on photosensitive films 38 wrapped on the rotating cylinder 39 to be scanned synchronously with the color transparency 15. To be directly applicable to the present invention, the wire 33 should carry an ortholuminous signal such as might be obtained by having a yellow filter at the point 30. It is not necessary that the color signals be obtained by scanning the original itself and it is known that color separations may be made and scanned synchronously to produce the necessary signals. The present invention is concerned only with the system after the color signals are established, for example, by photocells 25 and/or 31 and is not concerned with whether these photocells are energized by light from the original or from color separation negatives or positives.

In Fig. 2 is shown the more common form of circuit for producing a black printer. In this case only the three primary color signals are used and the signal which differs least from a white signal is selected in a black printer circuit 41. The signal on the wire 43 is then proportional to the least predominant subtractive color content or proportional to the greatest primary color component of the picture. Undercolor correction of the color signals is provided by suitable masking circuits 42 so that the signal on the wires 44 are reduced in proportion to the signal in the wire 43. It is not important to the present invention whether these signals operate glow lamps as shown or light valves or the like. Neither is it necessary that a light chopper be used ahead of the photocells 25. In the embodiment shown in Fig. 3, the photocells 25 receive light only as modified by the transparency being scanned and the output of the cells is direct current. The D.C. signal is then modulated in modulators 50 in a well known way by a carrier frequency of 150 kilocycles to produce an A.C. signal for the color correction circuits 26.

Figure 4:
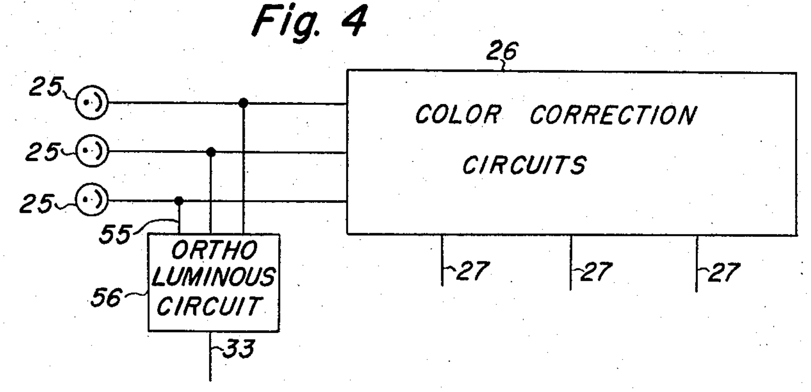

In order to provide the utmost versatility it is preferable to establish the ortholuminous signal from the three color signals. In Fig. 4 the three color signals pass by wires 55 to a circuit 56 in which they are added, preferably with suitable weighting. The term "ortholuminous" covers any signal which approximates the visual tone value of the original being scanned.

Figure 5:
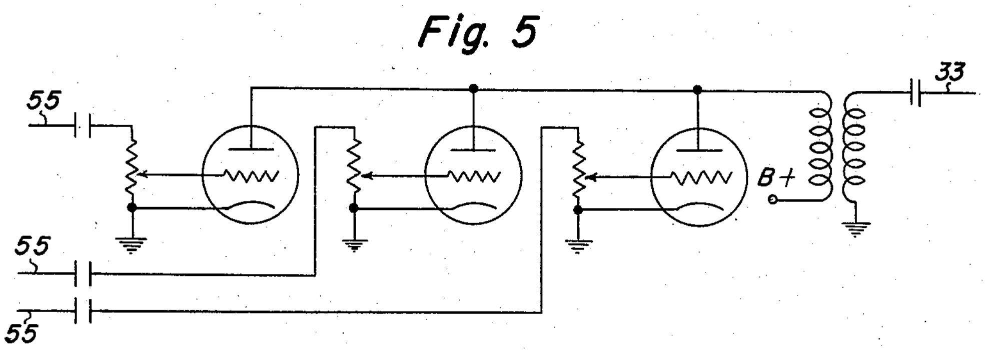

As shown in Fig. 5, A.C. signals may be added simply by connecting them to suitable triodes whose plate currents are added and passed through a transformer.

Figure 6:
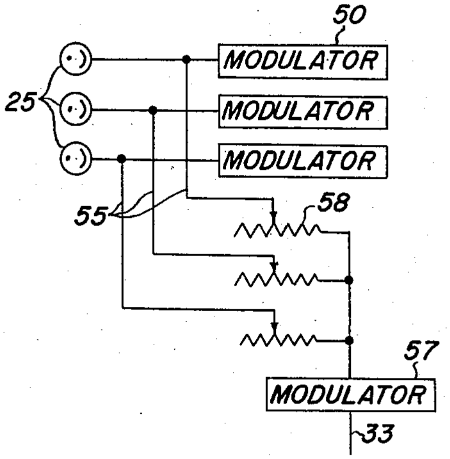
Figure 7:
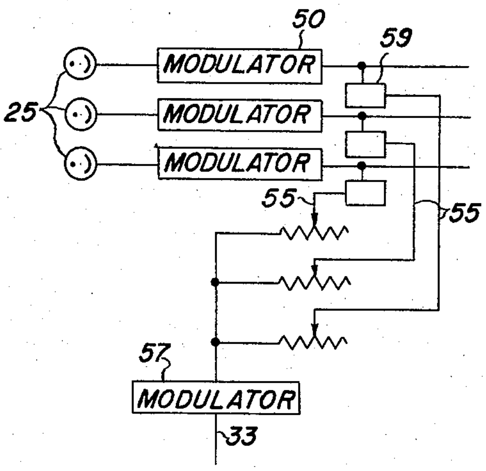

Fig. 6 shows an extremely simple method of adding the three color signals when they are in D.C. form. The wires 55 in this case merely connect the three signals to fixed or variable resistances 58 which are in parallel and which are adjustable to give the desired weight to the signals. The sum of the three signals is then modulated in a modulator 57 to provide an A.C. signal in the wire 33. Fig. 7 is a slight modification of this in which the D.C. color signals are first modulated by the modulators 50 and then rectified by rectifiers 59 before being imposed on the wires 55. This is a convenient way to provide the ortholuminous signal in practice since portions of the color signals are rectified anyway for masking in the color correction circuit. Also, the ortholuminous signal has the same contrast as the color signals even if the latter have passed through compression circuits.

The present invention can employ an ortholuminous signal on the wire 33 produced by any of these methods from the three color signals or produced by separate scanning of the original through a yellow filter or by scanning a yellow filter separation of the original.

In Fig. 8 the ortholuminous circuit is connected by dotted lines to the three color circuits or to a separate photocell to illustrate the fact that the ortholuminous signal may be set up either way. Similarly, the color channels at the output of the color correction circuits 26 carry signals on wires 60 which may or may not be undercolor corrected for black. In any case the three color signals are fed into a tone value computer 61 and then the ortholuminous signal is reduced in the circuit 62 by the tone value signal. As pointed out above, this tone value computer may be quite involved and may as a first approximation attempt to apply the additivity rule and as a second and successive approximations, attempt to compute and correct all of the errors in the additivity rule and in the spectral absorption of the ultimate inks to be used. This would be the theoretical way of attempting the present invention and, subject to the limitations of the electrical computer circuits, should be operable. However, a much simpler system has been found to be correct in practice although the theoretical basis for the simpler system is not immediately apparent.

The simple system is illustrated in Fig. 9 and constitutes the most preferred embodiment of the invention. The photoelectric cells 25 receive light from the red, green, and blue components of the original, either directly from the original or from color separations. The red, green, and blue signals pass partly to the color correction circuits 26 and partly by wires 55 to a circuit 56 for producing an ortholuminous signal on the wire 33. The ortholuminous circuit 56 may take any of the forms shown in Figs. 5, 6, and 7. Color correction circuits 26 produce magenta, yellow and cyan signals on the connectors 27 and also through the selector circuit 41 produce a signal of the type formerly used for a black printer, but not so used in the present invention. The selector 41 selects the least subtractive color content signal. This selected signal or some fixed percentage thereof is then introduced to masking circuits 42 to provide undercolor correction of the color printer signals. For example, if there is 100 percent undercolor correction, one of the color printer signals is reduced to "zero," at each point. In practice only 80 or 90 percent undercolor correction is normally used since the operation of the masking circuit is then not so critical and there is some printer signal for each color at each point. The circuits 26, 41, and 42 are all standard circuits which have been used for this purpose and may take any of the known forms.

The standard circuits also include rectifiers and limiters 70 the outputs of which operate glow lamps 36 for scanning the magenta, yellow, and cyan printers. Part of the magenta signal is fed through a resistor 71 to a compressor circuit 74. In order to introduce a slight correction for yellow as discussed above, a small portion of the yellow printer signal is also fed additively through a resistor 72. This type of correction may be carried even further, as indicated by the broken line 73 to add a small amount of the cyan signal to the magenta signal. This is in general not necessary and the signal going into the compressor 74 is primarily the magenta signal. The purpose of the compressor 74 is to provide the proper masking factor. That is, the output of the compressor 74 is some exponential power less than unity of the input signal. The exact exponent depends on the exponent in the output of the ortholuminous circuit 56. For example, if the ortholuminous signal is a linear one, i.e., has unity exponent, and if a 50% masking factor is desired, the compressor 74 is arranged to give a square root output signal. Actually the color printer signals are in general slightly compressed in the color correction circuits and hence the compressor 74 has somewhat less compressing to do. In fact, it may be practically a linear amplifier or circuit. One preferred form of the compressor 74 is that shown in U.S. Patent No. 2,581,124, Moe.

The output of the compressor 74 is then fed into a modulator tube 75 so that the ortholuminous signal on the wire 33 is divided by the output of the compressor 74.

Similarly, a portion of the cyan signal through resistor 81 is fed into a compressor 84 and the output of the latter divides the ortholuminous signal in a modulator tube 85. A small proportion of the yellow signal is added to the cyan signal through resistor 82 and it is also possible as indicated by broken line 83 to add a small portion of the magenta signal to the cyan signal if desired. By the two masking steps represented by the modulators 75 and 85, the ortholuminous signal is reduced by an amount proportional to the tone value printed by the magenta and cyan printers. The residual ortholuminous signal, through a compressor 86 and a rectifier limiter 87 operates a glow lamp 35 which scans the black printer in the usual way.

Non-linear resistors may be used at 72 and 82 so as to prevent the yellow signal having any excessive effect in blue areas.

One special feature of the present invention is that any errors in the degree of correction in the color correction circuits 26 or any errors introduced by the selector 41 and the undercolor correction through circuits 42 and also any tonal errors due to the rectifiers and limiters 70 will all be present in the signals passing through compressors 74 and 84 so that the correction of the ortholuminous signal will be in the direction of compensating for any of these prior errors in the color circuits. If any of the subsequent steps in the three color reproduction part of the system happen to be non-linear, the same degree of non-linearity or distortion of the scale may be introduced in the compressor circuits 74 and 84. On the other hand, if for some reason straight line reproduction is not desired, the distortion as desired may be introduced in the ortholuminous circuit 56. The compressor 86 is adjusted to give whatever desired linearity or distortion is to be used in the black printer.

While this preferred embodiment of the invention uses the ortholuminous signal only for producing the black printer and provides undercolor correction by means of a "least predominant" signal, it is quite practical to use the ortholuminous signal instead of the "least predominant" signal to provide the undercolor correction. The ortholuminous signal may be used directly as it appears on the wire 33 in Fig. 9 or may be used at any subsequent stage such as at the output of the rectifier limiter 87.

The percent masking of the ortholuminous signal by the magenta signal is adjusted so as to give the correct amount of black (usually none) in a saturated red area of the original. The percentage masking of the ortholuminous signal by the cyan signal is adjusted so as to give the correct amount of black (normally a small amount) in a saturated blue area. The contribution of the yellow signal is adjusted so that substantially no black is recorded in pure yellow areas, and may be prevented from adversely affecting other colors in including a non-linear resistor. For example, with certain standard inks in use in magazine printing, if the ortholuminous signal has a $\gamma$ of 0.7, and the color signals are masked (by 50% color correcting, 50% undercolor removal) to a gray scale $\gamma$ of 0.25, the ortholuminous signal needs to be masked about 50% by magenta, 77% by cyan.

It will be noted that the present invention constitutes a new type of black printer and a new method of making a black printer. To obtain the same effect in a purely photographic process would be somewhat complicated but it could be done by making color separation positives of suitable contrast of an original and making a negative from the three positives superimposed. This negative is then placed in contact with the original multicolored picture and photographed by white light or possibly through a light yellow filter to make a black printer negative.

The invention is thus in the method of preparing the black printer although the particular combination of circuits in the specific embodiment described above is also novel. The invention is of the scope of the appended claims.

I claim:

1. In an electrooptical scanning system, the method of preparing a black printer for use in the reproduction of a multicolored original which comprises establishing in three electric channels scanning signals corresponding to the red, green and blue components of the original and in a fourth channel a scanning signal corresponding to the ortholuminous value of the original, reducing said ortholuminous signal by a function of at least two of the others and scanning a light sensitive layer with a light beam whose intensity is proportional to the ortholuminous signal so modified.

2. In an electrooptical scanning system, the method of preparing a black printer for use in the reproduction of a multicolored original which comprises establishing in three electric channels scanning signals corresponding to the red, green and blue components of the original and in a fourth channel a scanning signal corresponding to the ortholuminous value of the original, dividing said ortholuminous signal by at least two of the others and scanning a light sensitive layer with a light beam whose intensity is proportional to the quotient.

3. In an electrooptical scanning system, the method of preparing a black printer for use in the reproduction of a multicolored original which comprises establishing in three electric channels scanning signals corresponding to the red, green and blue components of the original and in a fourth channel a scanning signal corresponding to the ortholuminous value of the original, establishing in a fifth channel a signal proportional to the least of the three color signals, modifying each of the three color signals by said fifth channel signal to form undercolor corrected color component signals, reducing said ortholuminous signal by a function of at least two of the undercolor corrected signals and scanning a light sensitive layer with a light beam whose intensity is proportional to the ortholuminuous signal so modified.

4. In an electrooptical scanning system, the method of preparing a black printer for use in the reproduction of a multicolored original which comprises establishing in three electric channels scanning signals corresponding to the red, green and blue components of the original and in a fourth channel a scanning signal corresponding to the ortholuminous value of the original, adding a small portion of said blue component signal to each of the other color component signals, dividing said ortholuminous signal by the resultant red plus blue and green plus blue signals and scanning a light sensitive layer with a light beam whose intensity is proportional to the quotient.

5. In an electrooptical scanning system, the method of preparing a black printer for use in the reproduction of a multicolored original which comprises establishing in three electric channels scanning signals corresponding to the red, green and blue components of the original and in a fourth channel a scanning signal corresponding to the ortholuminous value of the original, establishing in another channel a signal proportional to the ortholuminous value of a three color print made from cyan, magenta and yellow printers corresponding respectively to the red, green, and blue signals, modifying said ortholuminous signal by said another channel signal and scanning a light sensitive layer with a light beam whose intensity is proportional to the ortholuminous signal so modified.

6. In an electrooptical scanning system, the method of preparing a black printer for use in the reproduction of a multicolored original which comprises establishing in three electric channels scanning signals corresponding to the red, green and blue components of the original and in a fourth channel a scanning signal corresponding to the ortholuminous value of the original, establishing in a fifth channel a signal proportional to the least of the three color signals, modifying each of the three color signals by said fifth channel signal to form undercolor corrected color components, establishing in a sixth channel a signal proportional to the ortholuminous value of a three color print made from cyan, magenta, and yellow printers corresponding respectively to the undercolor corrected red, green, and blue signals, modifying said ortholuminous signal by said sixth channel signal and scanning a light sensitive layer with a light beam whose intensity is proportional to the ortholuminous signal so modified.

7. In an electrooptical scanning system, the method of preparing a black printer for use in the reproduction of a multicolored original which comprises establishing in three electric channels scanning signals corresponding to color corrected cyan, magenta, and yellow printers, and in a fourth channel a scanning signal corresponding to the ortholuminous value of the original, establishing in a fifth channel a signal representing the least predominant subtractive color content, modifying each of the three color printer signals by said fifth channel signal for undercolor correction, adding a small portion of the yellow printer signal as modified to each of the other two modified signals, dividing said ortholuminous signal by the resultant cyan plus yellow and magenta plus yellow signals and scanning a light sensitive layer with a light beam whose intensity is proportional to the quotient.

8. In an electrooptical scanning system, the method of preparing a black printer for use in the reproduction of a multicolored original which comprises establishing in three electric channels scanning signals corresponding to color corrected cyan, magenta, and yellow printers, and in a fourth channel a scanning signal corresponding to the ortholuminous value of the original, establishing in a fifth channel a signal representing the least predominant subtractive color content, modifying each of three color printer signals by said fifth channel signal for undercolor correction, establishing in a sixth channel a signal proportional to the ortholuminous value of a three color print made from printers corresponding to the undercolor corrected printers, dividing said fourth channel signal by the sixth channel signal and scanning a light sensitive layer with a light beam whose intensity is proportional to the quotient.

9. In an electrooptical scanning system having three electric channels respectively carrying signals corresponding to cyan, magenta, and yellow printers for reproduction of a multicolored original, a circuit for producing a black printer signal comprising a fourth channel, means for establishing in the fourth channel a signal corresponding to the ortholuminous value of the original and means for dividing the fourth channel signal by signals approximately linearly proportional to the sum of the cyan and magenta printer signals.

10. In an electrooptical scanning system having three electric channels respectively carrying signals corresponding to cyan, magenta, and yellow printers for reproduction of a multicolored original, a circuit for producing a black printer signal comprising a fourth channel, means for establishing in the fourth channel a signal corresponding to the ortholuminous value of the original, a fifth channel, means for establishing in the fifth channel a signal proportional to the least predominant of the cyan, magenta, and yellow contents, circuit means for modifying each of the three color printer signals by the fifth channel signal and means for dividing the fourth channel signal by signals approximately linearly proportional to the sum of the cyan and magenta signals so modified.

11. In an electrooptical scanning system having three electric channels respectively carrying signals corresponding to cyan, magenta, and yellow printers for reproduction of a multicolored original, a circuit for producing a black printer signal comprising a fourth channel, means for establishing in the fourth channel a signal corresponding to the ortholuminous value of the original, a branch circuit for receiving the magenta and yellow signals and for adding a small portion of the yellow signal to the magenta signal, a second branch circuit for receiving the cyan and yellow signals and for adding a small portion of the yellow signal to the cyan signal and means for dividing the fourth channel signal by the sum of the signals from the branch circuits.

12. In an electrooptical scanning system having three electric channels respectively carrying signals corresponding to the red, green, and blue components of a multicolored original, a circuit for producing a black printer signal, comprising a fourth channel, means for additively feeding a portion of the red, green, and blue signals into the fourth channel to produce therein a signal corresponding to the ortholuminous value of the original, circuit means connected to the three color channels to produce respectively therein signals corresponding to cyan, magenta, and yellow printers for reproduction of the original and means for dividing the fourth channel signal by signals approximately linearly proportional to the sum of the cyan and magenta printer signals.

References Cited in the file of this patent

UNITED STATES PATENTS

| | | |
|---|---|---|
| 2,183,525 | Yule | Dec. 19, 1939 |
| 2,253,086 | Murray | Aug. 19, 1941 |
| 2,316,581 | Hardy | Apr. 13, 1943 |
| 2,413,706 | Gunderson | Jan. 7, 1947 |
| 2,560,567 | Gunderson | July 17, 1951 |
| 2,567,040 | Sziklai | Sept. 4, 1951 |
| 2,606,245 | Hall | Aug. 5, 1952 |
| 2,748,190 | Yule | May 29, 1956 |